2 Sheets—Sheet 1.

A. A. MILLER.
Harvester-Rake.

No. 209,909. Patented Nov. 12, 1878.

WITNESSES
Robert Emmett
James J. Sherby

INVENTOR.
A. A. Miller.
Gilmore, Smith & Co.
ATTORNEYS.

2 Sheets—Sheet 2.
A. A. MILLER.
Harvester-Rake.
No. 209,909. Patented Nov. 12, 1878.
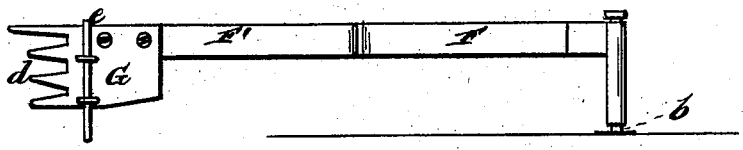
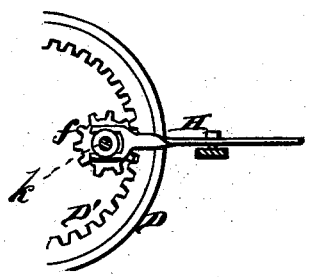
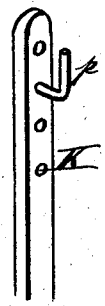
WITNESSES
INVENTOR.
ATTORNEYS.

UNITED STATES PATENT OFFICE.

ANDREW A. MILLER, OF SMITHTON, ILLINOIS, ASSIGNOR OF ONE-HALF HIS RIGHT TO JAMES W. SMITH, OF SAME PLACE.

IMPROVEMENT IN HARVESTER-RAKES.

Specification forming part of Letters Patent No. 209,909, dated November 12, 1878; application filed June 15, 1878.

*To all whom it may concern:*

Be it known that I, ANDREW A. MILLER, of Smithton, in the county of St. Clair and State of Illinois, have invented a new and valuable Improvement in Harvesters; and I do hereby declare that the following is a full, clear, and exact description of the construction and operation of the same, reference being had to the annexed drawings, making a part of this specification, and to the letters and figures of reference marked thereon.

Figure 1:
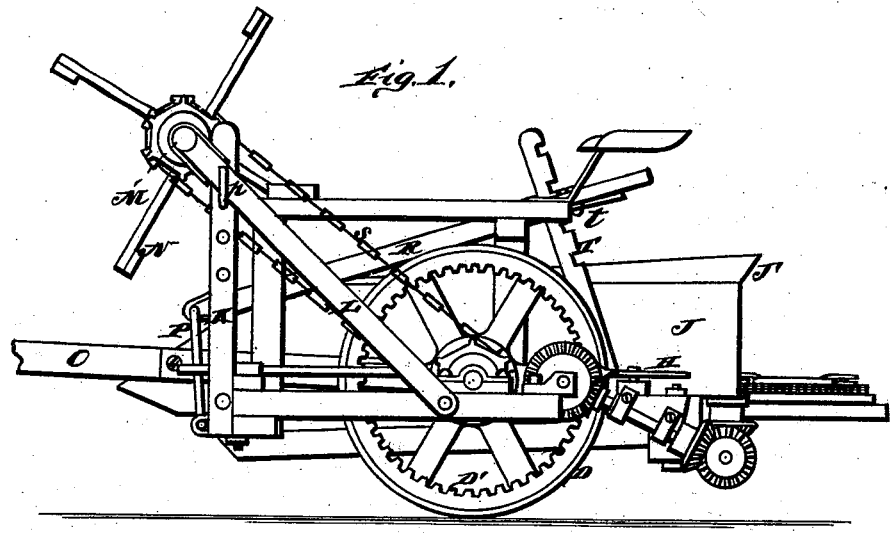
Figure 2:
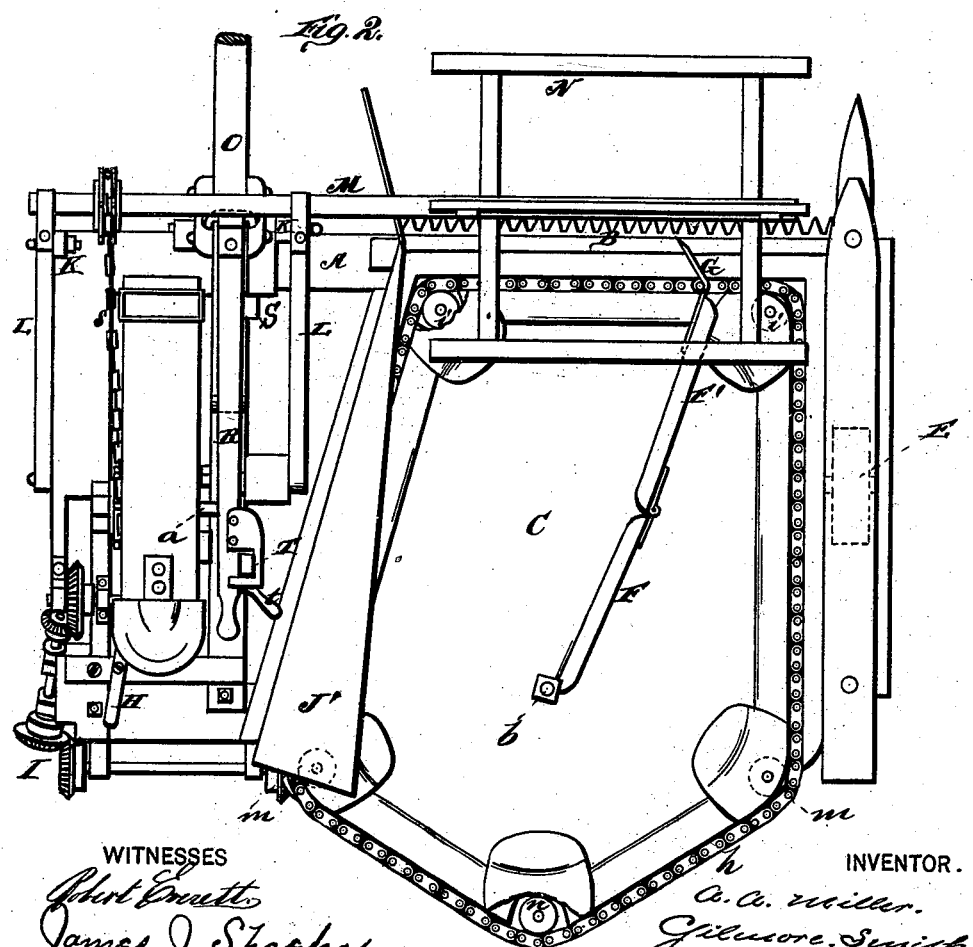

Figure 1 of the drawings is a representation of a side view of my harvester; Fig. 2 is a plan view; Figs. 3 and 4 are details, and Fig. 5 is a perspective detail.

The nature of my invention relates to the construction and arrangement of a harvester, as will be hereinafter more fully set forth.

The annexed drawings, to which reference is made, fully illustrate my invention.

A represents the frame-work of my harvester, constructed in any suitable manner to receive the various working parts of the machine. B represents the finger-bar, and C the platform upon which the cut grain falls.

The frame A is supported by a wheel, E, at the outer end, and at the inner end by a large driving-wheel, D, secured on an axle, *a*.

On the platform C is an upright post or stub, *b*, to which is pivoted an arm, F. This arm F has another arm, F', hinged to its outer end, and to the outer end of the arm F' is attached the rake G.

The rake G consists simply of an angular casting, the outer end of which has a vertical series of four or more teeth, *d*, the upper tooth being made longer than the rest, as shown.

The rake G is at its bend or angle provided with a pin, *e*, which extends downward, and connects with an endless chain, *h*. This chain is arranged and runs in a track formed in the platform C around pulleys *i i* at the front, so that a portion of the chain will run parallel with the cutter-bar. The chain then passes backward around pulleys *m m* at the sides, near the rear end of the platform, and around a center pulley, *n*, still farther in the rear, as shown. By this arrangement the drive-chain *h* follows an irregular path circumferential to the pivot of the rake, rendering the construction of the rake very simple, one point only being employed, and its action certain where it is required to be operative.

The main driving-wheel D is on its outer side provided with an internal-gear wheel, D', which meshes with a movable pinion, *f*, feathered on a shaft, *k*, and this pinion is moved by means of a lever, H, so as to throw it in and out of gear with the gear-wheel D'.

The shaft *k* is, by means of suitable gearing I, connected with the shaft of the pulley *m* at at the inner side of the platform, so as to give the said pulley a rotary motion, and thus move the endless chain *h*, and with said chain cause the rake G and jointed rake-arm F F' to sweep around the post *b*, to rake the grain inward toward the inner side of the platform and then backward and off at the rear end thereof.

Along the inner side of the platform is a shield, J, with overhanging flange J' along its upper edge, to prevent the grain being thrown or blown over into the gearing.

At the front of the main frame, near the inner end, are two vertical standards, K K, which are perforated, and have hooks *p p* placed adjustably in them. These hooks support two inclined arms, L L, the rear ends of which are pivoted to the main frame on or nearly on a line with the axle *a* of the driving-wheel D.

The upper forward ends of the arms L L are provided with suitable boxes or bearings to receive the shaft M, on which the reel N is secured. By means of the perforated standards K, hoops *p*, and pivoted arms L the reel can be adjusted up and down, as required, and it is rotated by means of a chain, *s*, connecting a pulley on the axle *a* with a pulley on the reel-shaft M.

O represents the tongue, hinged at its inner end to the frame A at or near the axle *a*, and at the front edge of the frame is connected a stirrup or bail, P, one arm of which passes through a loop attached to the tongue to act as a guide for the same.

To the top of the stirrup P is pivoted a lever, R, which extends rearward, and is, by a bar, S, connected with the tongue. The rear end of the lever R is provided with a catch, t, to take into a ratchet or rack-bar, T, by means of which the front of the machine can be raised and lowered, as required.

What I claim as new, and desire to secure by Letters Patent, is—

In a harvester, the combination of the jointed table-rake with the endless drive-chain, arranged to follow an irregular path circumferential to the rake-pivot, substantially as and for the purposes set forth.

In testimony that I claim the above I have hereunto subscribed my name in the presence of two witnesses.

ANDREW ALONZO MILLER.

Witnesses:
 WILLIAM J. WARREN,
 JAMES W. SMITH.